US009916245B2

(12) United States Patent
Eickemeyer et al.

(10) Patent No.: US 9,916,245 B2
(45) Date of Patent: Mar. 13, 2018

(54) ACCESSING PARTIAL CACHELINES IN A DATA CACHE

(71) Applicant: International Business Machines Corporation, Armonk, NY (US)

(72) Inventors: Richard J. Eickemeyer, Rochester, MN (US); Kimberly M. Fernsler, Cedar Park, TX (US); Guy L. Guthrie, Austin, TX (US); David A. Hrusecky, Cedar Park, TX (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/161,418

(22) Filed: May 23, 2016

(65) Prior Publication Data
US 2017/0337132 A1 Nov. 23, 2017

(51) Int. Cl.
*G06F 12/08* (2016.01)
*G06F 12/0811* (2016.01)
*G06F 12/0875* (2016.01)

(52) U.S. Cl.
CPC ...... *G06F 12/0811* (2013.01); *G06F 12/0875* (2013.01); *G06F 2212/283* (2013.01); *G06F 2212/452* (2013.01)

(58) Field of Classification Search
CPC ............. G06F 12/0811; G06F 12/0875; G06F 2212/283; G06F 2212/452
See application file for complete search history.

(56) References Cited

U.S. PATENT DOCUMENTS

| 5,586,297 A | 12/1996 | Bryg et al. |
| 6,353,877 B1 | 3/2002 | Duncan et al. |
| 6,499,085 B2 * | 12/2002 | Bogin ................. G06F 12/0835 711/118 |
| 6,571,322 B2 | 5/2003 | Arimilli et al. |
| 7,143,246 B2 | 11/2006 | Johns |
| 7,558,887 B2 | 7/2009 | Gower et al. |
| 7,861,014 B2 | 12/2010 | Gower et al. |
| 2010/0268884 A1 * | 10/2010 | Cummings ......... G06F 12/0822 711/122 |
| 2014/0089602 A1 * | 3/2014 | Biswas ............... G06F 12/0804 711/144 |

(Continued)

OTHER PUBLICATIONS

Park et al., "Future Cache Design using STT MRAMs for Improved Energy Efficiency: Devices, Circuits and Architecture", 49th ACM/EDAC/IEEE Design Automation Conference (DAC), Jun. 2012, pp. 492-497, IEEE Xplore Digital Library (online), ISBN: 978-1-4503-1199-1, DOI: 10.1145/2228360.2228447.

*Primary Examiner* — Ryan Bertram
(74) *Attorney, Agent, or Firm* — Brandon C. Kennedy; Robert R. Williams; Kennedy Lenart Spraggins LLP

(57) ABSTRACT

Accessing partial cachelines in a data cache including storing a first portion of a cacheline in a cache entry of the data cache; relaunching a load instruction targeting a second portion of the cacheline, wherein the second portion of the cacheline is not stored in the data cache; determining that the load instruction targets a portion of the cacheline not stored in the cache entry; storing the second portion of the cacheline in the data cache; and reading the second portion of the cacheline from the data cache according to the load instruction.

17 Claims, 7 Drawing Sheets

(56) References Cited

U.S. PATENT DOCUMENTS

| | | | |
|---|---|---|---|
| 2016/0041905 A1* | 2/2016 | Turner ................ | G06F 12/0802 711/3 |
| 2017/0068621 A1* | 3/2017 | Watanabe ........... | G06F 12/0891 |
| 2017/0123979 A1* | 5/2017 | V ........................ | G06F 12/0802 |

* cited by examiner

ACCESSING PARTIAL CACHELINES IN A DATA CACHE

BACKGROUND

Field of the Invention

The field of the invention is data processing, or, more specifically, methods, apparatus, and products for accessing partial cachelines in a data cache.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for accessing partial cachelines in a data cache are disclosed in this specification. Accessing partial cachelines in a data cache includes storing a first portion of a cacheline in a cache entry of the data cache; relaunching a load instruction targeting a second portion of the cacheline, wherein the second portion of the cacheline is not stored in the data cache; determining that the load instruction targets a portion of the cacheline not stored in the cache entry; storing the second portion of the cacheline in the data cache; and reading the second portion of the cacheline from the data cache according to the load instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
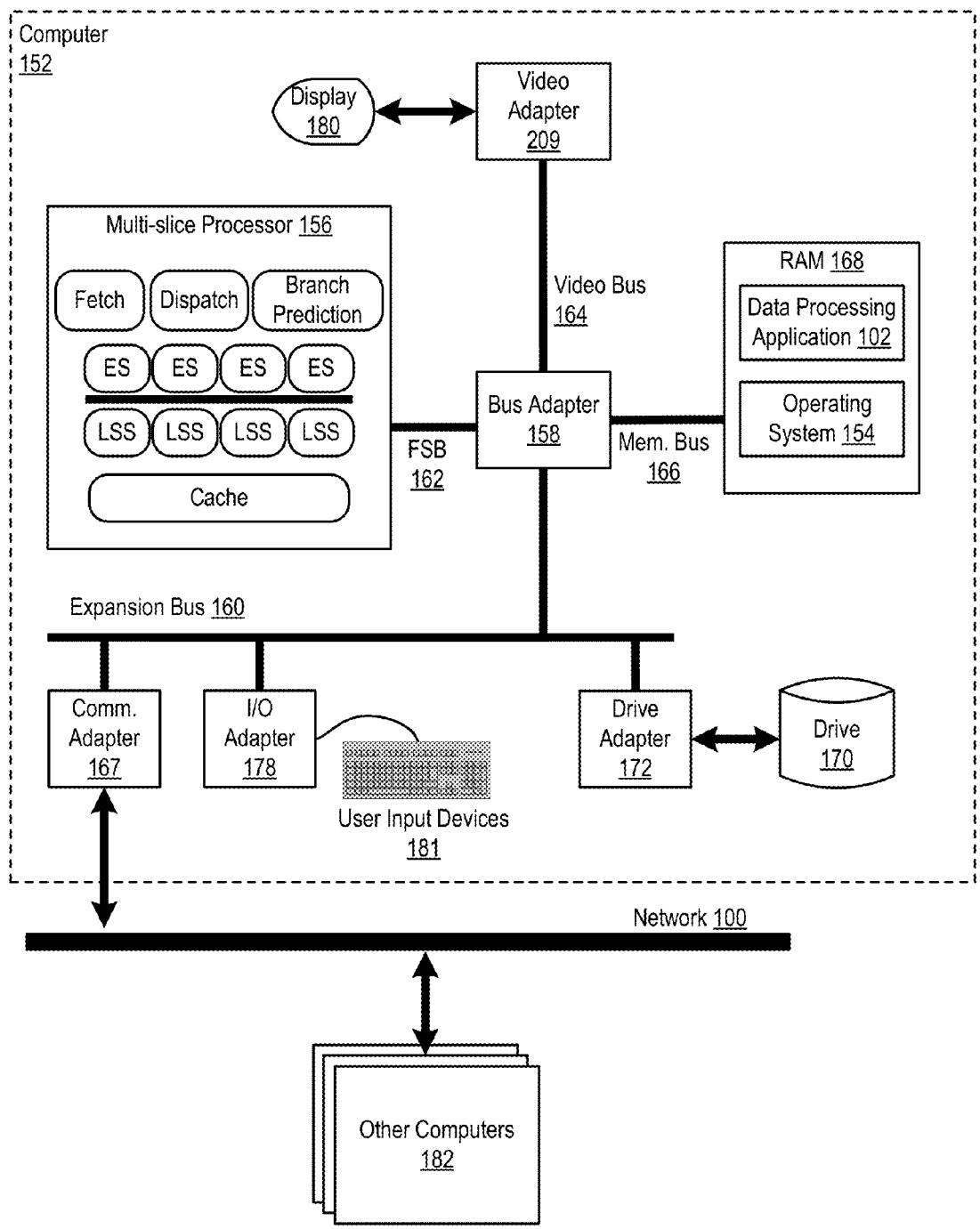
FIG. 1 sets forth a block diagram of an example system configured for accessing partial cachelines in a data cache according to embodiments of the present invention.

Exemplary methods and apparatus for accessing partial cachelines in a data cache in accordance with the present invention are described with reference to the accompanying drawings, beginning with FIG. 1. FIG. 1 sets forth a block diagram of an example system configured for accessing partial cachelines in a data cache according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
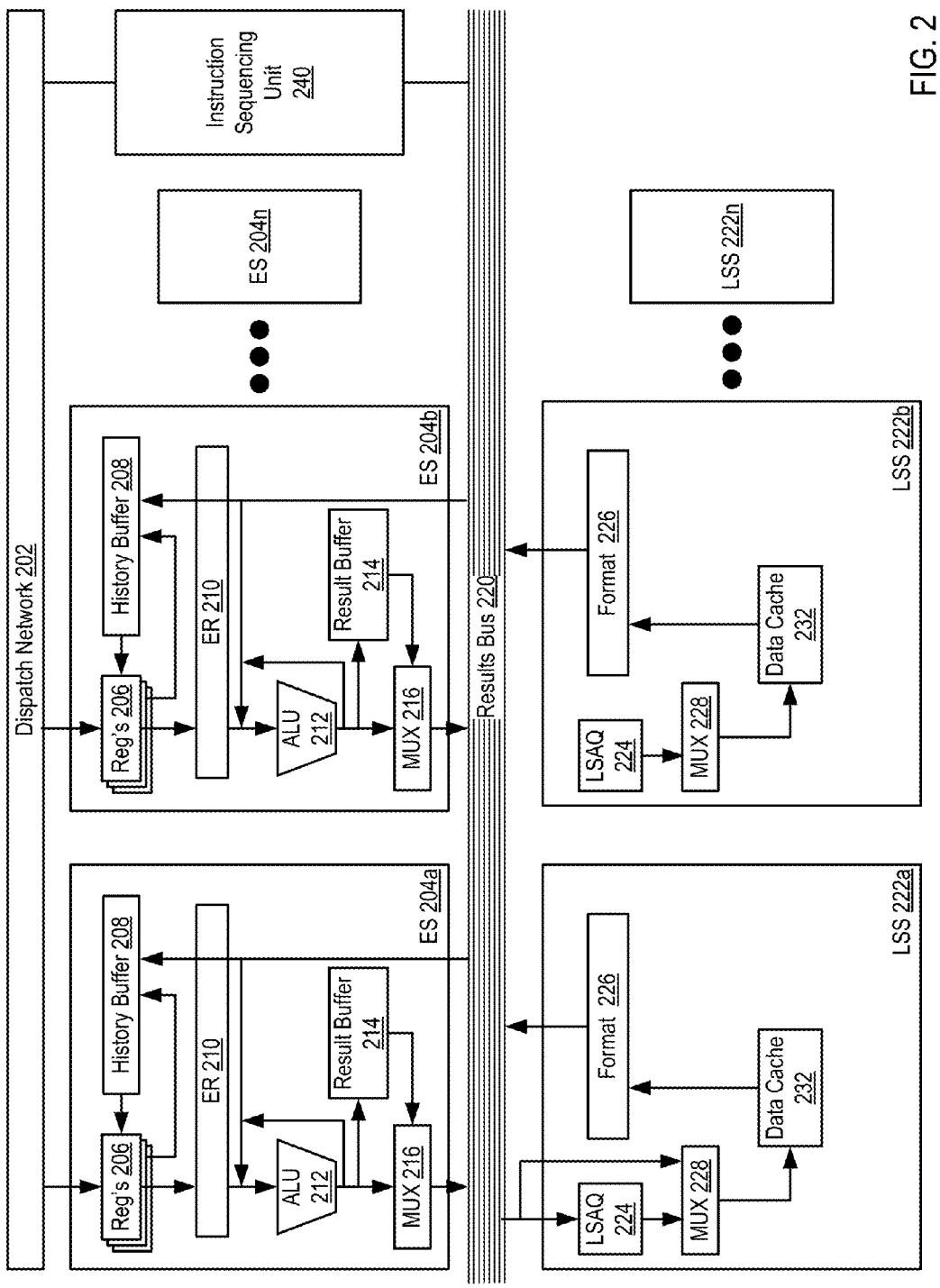
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
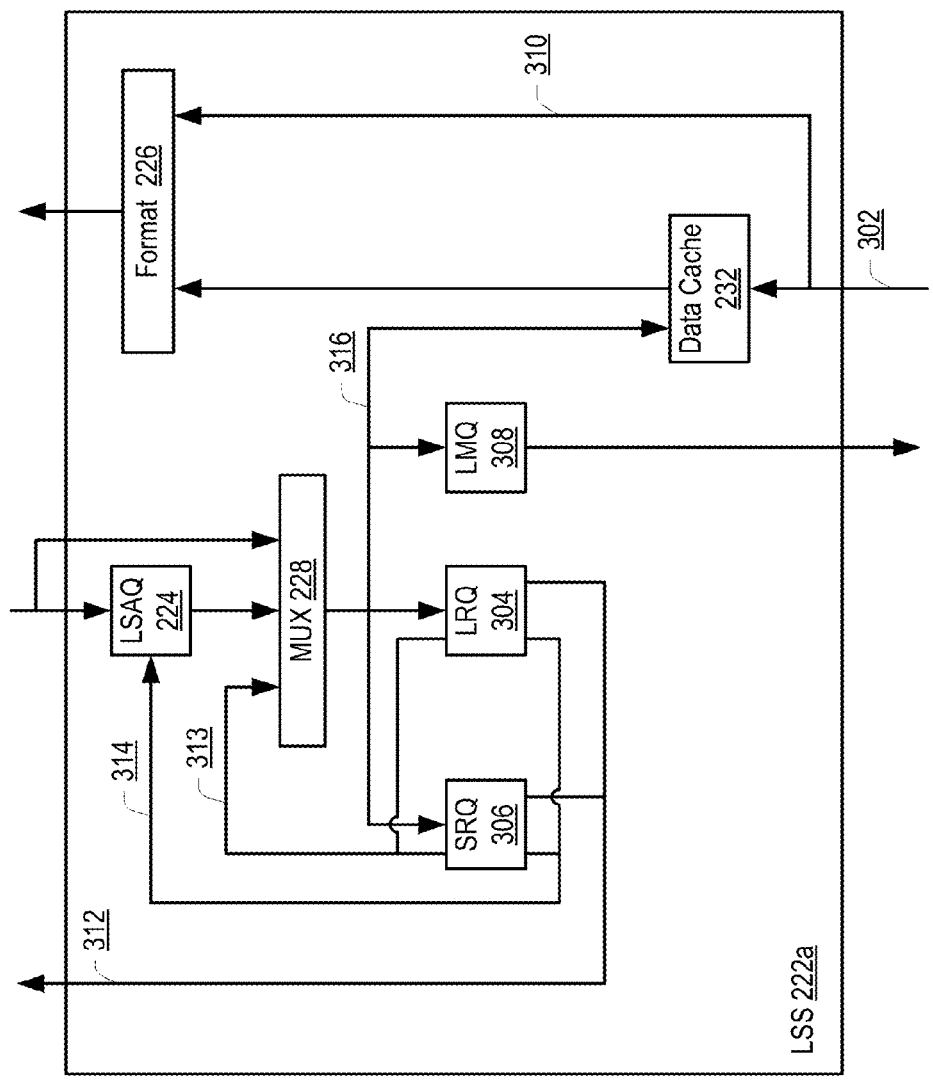
FIG. 3 sets forth a block diagram of a portion of a load/store slice of a multi-slice processor according to embodiments of the present invention.

For further explanation, FIG. 3 sets forth a block diagram depicting an expanded view of a load/store slice (222a) implementing architectural components that include a load/store access queue (LSAQ) (224), a load reorder queue (LRQ) (304), a load miss queue (LMQ) (308), a store reorder queue (SRQ) (306), a data cache (232), among other components.

In previous systems, if a load/store unit received an instruction from an instruction sequencing unit, and the load/store unit was unable to handle the instruction for some reason, then the load/store unit would notify the instruction sequencing unit that the instruction was being rejected and the load/store unit would discard information related to the rejected instruction. In which case, the instruction sequencing unit would continue maintaining information to track and maintain the rejected instruction until the instruction is resent to the load/store unit. An instruction may be rejected for a variety of reasons, including an address miss in an address translation cache, a set prediction miss, data cache banking collisions, an overload of the load miss queue (308), among other possible rejection conditions.

The load/store slice (222a), by contrast to the above previous system, is configured to determine a rejection condition for an instruction received from an instruction sequencing unit, however, the load/store slice (222a), instead of sending a reject signal to the instruction sequencing unit, maintains tracking and handling of the instruction—including information usable to relaunch or reissue the instruction—until the rejection condition is resolved. Further, an entry in the load reorder queue (304) or the store reorder queue (306) may be configured to maintain information for tracking an instruction that would otherwise have been rejected and removed from the load reorder queue (304). For example, if the load/store slice (222a) determines that a rejection condition exists for a given load or store instruction, then logic within the load/store slice may notify the load reorder queue (304) or the store reorder queue (306) to place the instruction in a sleep state for a given number of cycles, or to place the instruction in a sleep state until notified to awaken, or to immediately reissue the instruction, among other notifications to perform other operations.

In this way, the load/store slice (222a) may save cycles that would otherwise be lost if the instruction were rejected to the instruction sequencing unit because the load/store slice (222a) may more efficiently and quickly reissue the instruction when the rejection condition is resolved in addition to more quickly detecting resolution of a rejection condition than an instruction sequencing unit. For example, if the load/store slice (222a) determines that an instruction that is in a sleep state may be reissued in response to determining that one or more rejection conditions have been resolved preventing the instruction from completing, then the load/store store slice may notify the load reorder queue (304) or the store reorder queue (306) to relaunch or reissue the instruction immediately or after some number of cycles. The number of cycles may depend upon a type of rejection condition or upon other factors affecting reissue or relaunch of the instruction. In this example, the load reorder queue (304) or the store reorder queue (306) may reissue or relaunch an instruction by providing the load/store access queue (224) with information to reissue the instruction, where the load reorder queue (304) or the store reorder queue (306) may communicate with the load/store access queue (224) along line (314) and may provide data for reissuing or relaunching the instruction along line (313).

Another improvement that results from the load/store slice (222a) maintaining an instruction if a rejection condition is determined is that the load/store slice (222a) uses fewer resources, such as logic and circuitry for latches and other components, to maintain the instruction than an instruction sequencing unit. In other words, given that the instruction sequencing unit may rely on the load/store slice (222a) in handling the instruction to completion, the instruction sequencing unit may free resources once the instruction is provided to the load/store slice (222a).

Further, the instruction sequencing unit (240), based at least in part on communications with the load/store slice (222a), may determine when and whether to wake instructions that may be dependent on a current instruction being handled by the load/store slice (222a). Therefore, if the load/store slice (222a) determines that a rejection condition exists, the load/store slice (222a) delays a notification to the instruction sequencing unit (240) to awaken dependent instructions to prevent the instruction sequencing unit (240) from issuing dependent instructions that are subsequently unable to finish due to lack of availability of results from a current instruction. In this way, the instruction sequencing unit (240) may avoid wasting execution cycles reissuing dependent instructions that are unable to finish.

For example, the load/store slice (222a) may communicate with the instruction sequencing unit (240) through the generation of signals indicating, at different points in handling a load instruction, that a load instruction is to be reissued or that data for a load instruction is valid. In some cases, in response to the instruction sequencing unit (240) receiving a signal from the load/store slice (222a) that a given instruction is to be reissued, the instruction sequencing unit (240) may awaken instructions dependent upon the given instruction with the expectation that the given instruction, after being reissued, is going to finish and provide valid data.

The load/store slice (222a) may also retrieve data from any tier of a memory hierarchy, beginning with a local data cache (232), and extending as far down in the hierarchy as needed to find requested data. The requested data, when received, may be provided to general purpose registers, virtual registers, or to some other destination. The received data may also be stored in a data cache (232) for subsequent access. The load/store slice (222a) may also manage translations of effective addresses to real addresses to communicate with different levels of memory hierarchy.

A store reorder queue (306) may include entries for tracking the cache operations for sequential consistency and may reissue operations into the load/store pipeline for execution independent of an execution slice.

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit, or some other logical component, that the data is available.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices.

Figure 4:
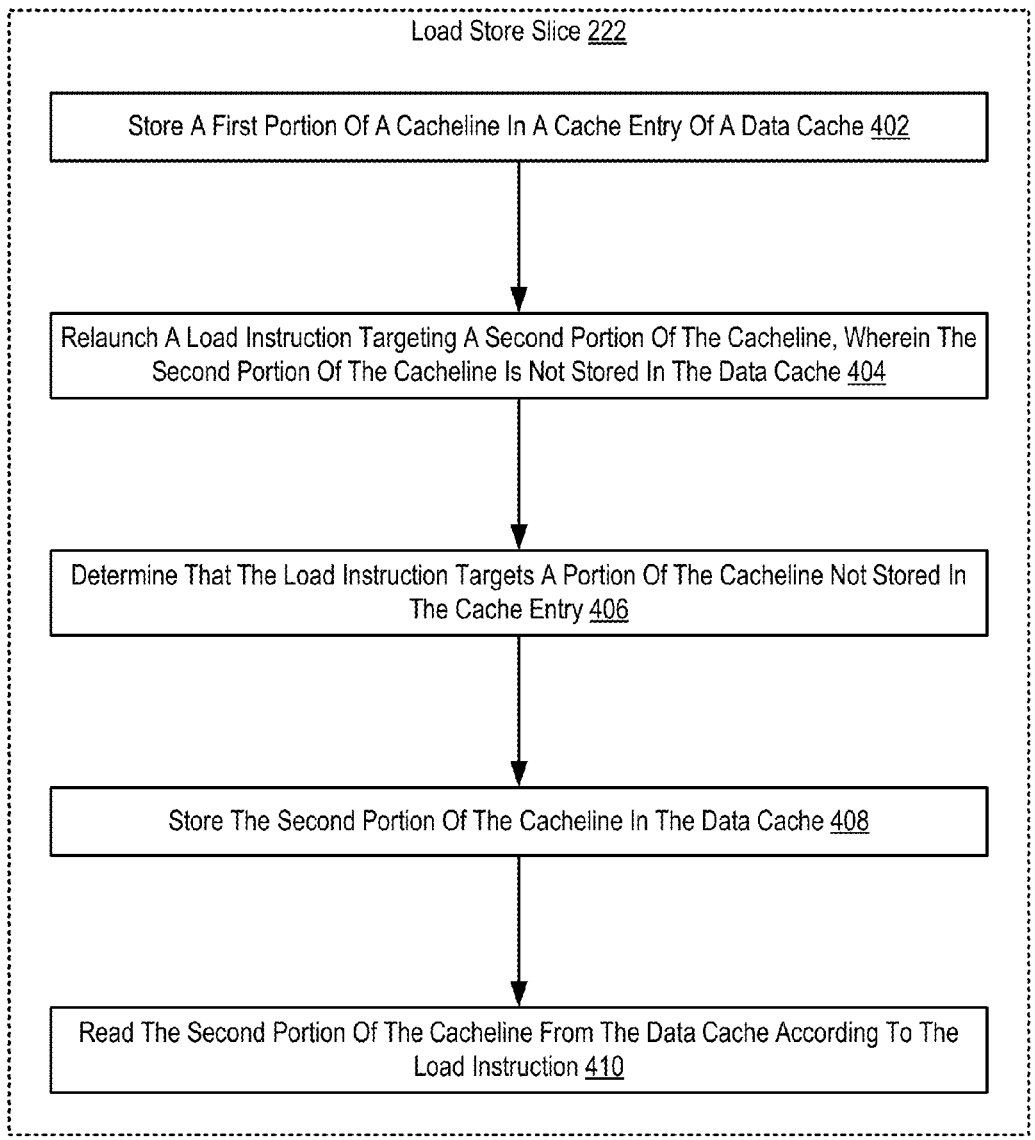
FIG. 4 sets forth a flow chart illustrating an exemplary method for accessing partial cachelines in a data cache according to embodiments of the present invention.

For further explanation, FIG. 4 sets forth a flow chart illustrating an exemplary method for accessing partial cachelines in a data cache. The method of FIG. 4 may be carried out by a multi-slice processor similar to that in the examples of FIGS. 1-3. Such a multi-slice processor may include an instruction sequencing unit (240), and a plurality of load/store slices (222a-222n), where each of the load/store slices may implement a load/store access queue (224), a load reorder queue (304), and a store reorder queue (306), as described above with regard to FIG. 3.

The method of FIG. 4 includes storing (402) a first portion of a cacheline in a cache entry of a data cache (232). Storing (402) a first portion of a cacheline in a cache entry of a data cache (232) may be carried out by a memory controller storing, in the data cache, only one portion of a cacheline without transferring other portions of the cacheline or the entire cacheline. For example, if a cacheline is 128 bytes, and a load instruction targets data within the first 64-byte portion, then the memory controller may transfer only the first 64-byte portion into a 128-byte cache entry in the data cache (232) from the lower levels of memory. The load store slice (222) may be configured to recognize an internal operation that targets only a portion of a cacheline, and signal to the memory controller that providing only that portion of the cacheline to the data cache is acceptable.

A cacheline is a set of data that includes data targeted by a load instruction or other internal operation. The data cache (232) may be the highest level of memory in the memory hierarchy, such as a level 1 cache. The cache entry may be a location within the data cache (232) that a cacheline, or a portion of a cacheline, is stored. The cache entry may be larger than the portion of the cacheline stored in the cache entry. Further, the cache entry may be the same size or a similar size as the entire cacheline. For example, a cache entry may be 64-bytes and a cacheline may be 64-bytes, but only a 32-byte portion of the cacheline may be stored in the cache entry. The remaining portions of the cache entry may contain stale data, such as data left from previous memory operations.

The method of FIG. 4 also includes relaunching (404) a load instruction targeting a second portion of the cacheline, wherein the second portion of the cacheline is not stored in the data cache (232). Relaunching (404) a load instruction targeting a second portion of the cacheline, wherein the second portion of the cacheline is not stored in the data cache (232) may be carried out by launching the load instruction, receiving an indication that that the data cache includes the cacheline, reading stale data from the cacheline, and storing, in a LRQ (304) an indication that the second portion of the cacheline is not stored in the data cache. The relaunched load instruction may be different from the instruction or internal operation that resulted in the first portion of the cacheline being stored in the data cache (232).

Relaunching (404) a load instruction targeting a second portion of the cacheline, wherein the second portion of the cacheline is not stored in the data cache (232) may further be carried out by launching the load instruction targeting a second portion of the cacheline, receiving an indication that data cache (232) includes the cacheline, reading stale data from the cacheline, and in response to reading stale data from the cacheline, storing, in a load reorder queue (304), an indication that the second portion of the cacheline is not stored in the data cache (232).

The method of FIG. 4 also includes determining (406) that the load instruction targets a portion of the cacheline not stored in the cache entry. Determining (406) that the load instruction targets a portion of the cacheline not stored in the cache entry may be carried out by receiving an indication that the data cache (232) includes the cacheline, dismissing the indication that the data cache (232) includes the cacheline in response to an indication, stored in the LRQ (304), that the second portion of the cacheline is not stored in the data cache (232).

The method of FIG. 4 also includes storing (408) the second portion of the cacheline in the data cache (232). Storing (408) the second portion of the cacheline in the data cache (232) may be carried out by marking the cache entry in the data cache (232) for replacement, and requesting the cacheline from lower levels of memory.

The method of FIG. 4 also includes reading (410) the second portion of the cacheline from the data cache (232) according to the load instruction. Reading (410) the second portion of the cacheline from the data cache (232) according to the load instruction may be carried out by accessing a cache entry that includes the cacheline, and reading a portion of the cacheline targeted by the load instruction.

Figure 5:
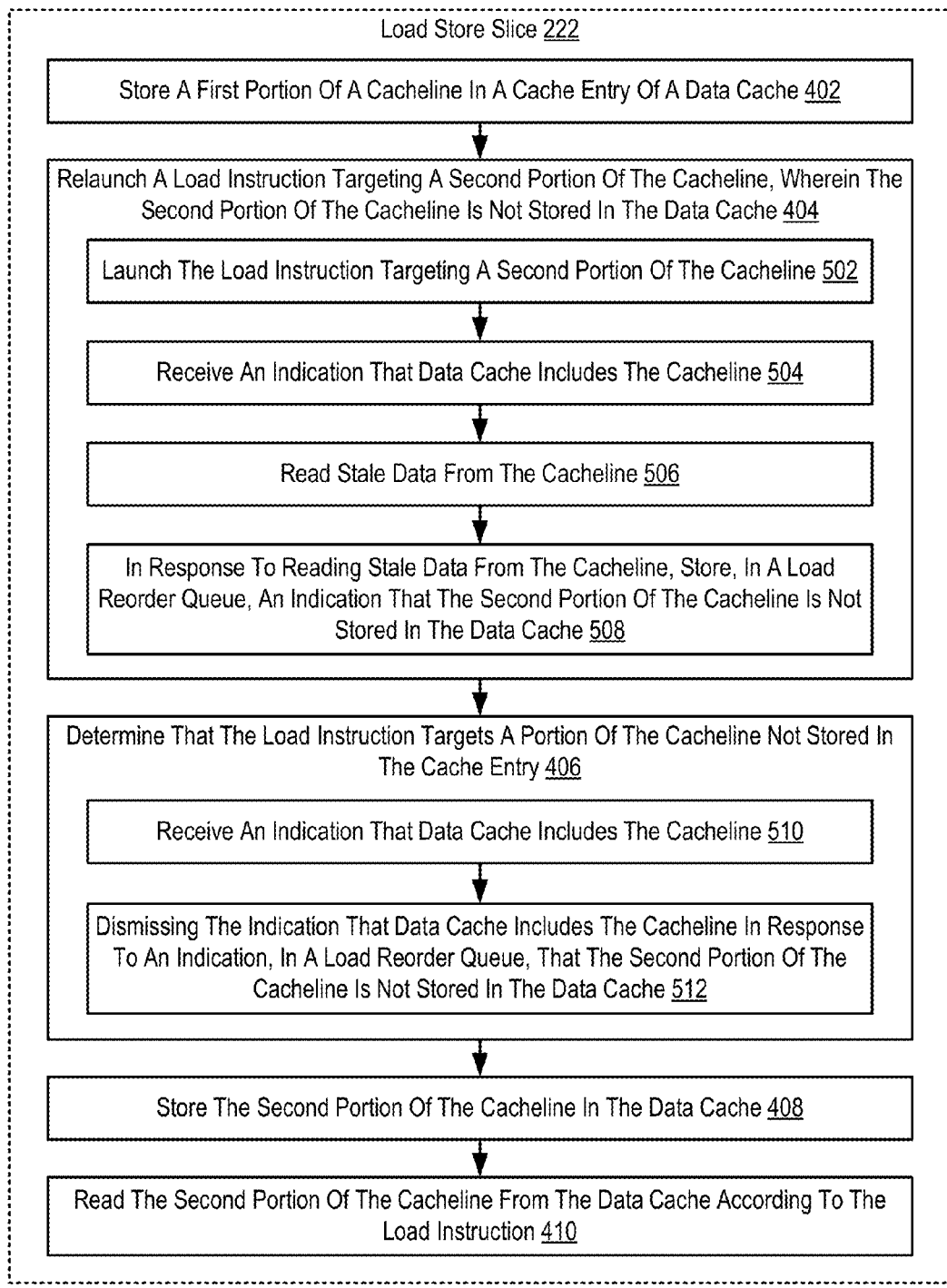
FIG. 5 sets forth a flow chart illustrating an exemplary method for accessing partial cachelines in a data cache according to embodiments of the present invention.

For further explanation, FIG. 5 sets forth a flow chart illustrating an exemplary method for accessing partial cachelines in a data cache according to embodiments of the present invention that includes storing (402) a first portion of a cacheline in a cache entry of a data cache (232); relaunching (404) a load instruction targeting a second portion of the cacheline, wherein the second portion of the cacheline is not stored in the data cache (232); determining (406) that the load instruction targets a portion of the cacheline not stored in the cache entry; storing (408) the second portion of the cacheline in the data cache (232); and reading (410) the second portion of the cacheline from the data cache (232) according to the load instruction.

The method of FIG. 5 differs from the method of FIG. 4, however, in that relaunching (404) a load instruction targeting a second portion of the cacheline, wherein the second portion of the cacheline is not stored in the data cache (232) includes launching (502) the load instruction targeting a second portion of the cacheline; receiving (504) an indication that data cache (232) includes the cacheline; reading (506) stale data from the cacheline; and in response to reading stale data from the cacheline, storing (508), in a load reorder queue (304), an indication that the second portion of the cacheline is not stored in the data cache (232).

Launching (502) the load instruction targeting a second portion of the cacheline may be carried out by initiating the load process and requesting the targeted data from the data cache. The load instruction may include an address, such as an effective address or physical address, of the targeted data (i.e., the data the load instruction intends to read). The targeted data may be within one or more portions of a cacheline. Using the address, a request for the cacheline containing the data is sent to the data cache (232).

Receiving (504) an indication that data cache (232) includes the cacheline may be carried out by a set predict mechanism informing the LSS (222) that the requested cacheline is stored in the data cache (232). The set predict mechanism may be configured such that it is unable to determine whether the portion of the cacheline targeted by the instruction is stored in the data cache (232). Rather, the set predict mechanism may indicate that the cacheline is stored, and thus send the LSS (222) a "hit" message that the requested data is stored in the data cache, even though only a portion of the cacheline is stored in the data cache (232), and the portion stored does not include the requested data.

For example, assume a cacheline includes portion A and portion B, but only portion A has been stored in a cache entry in the data cache (232). A load instruction targeting portion B may be issued, and the set predict mechanism may respond with a "hit" indicating that the cacheline is stored in the data cache (232), even though portion B is not stored in the data cache (232). A set predict mechanism is logic within the LSS (222) that quickly indicates whether a requested cacheline is likely stored in the data cache (232).

Reading (506) stale data from the cacheline may be carried out by reading a part of the cacheline that would store the requested portion of the cacheline had that portion of the cacheline been stored in the cache entry. Instead, data previously stored in that location of the cache entry is read. The data that was read, therefore, is stale data. Stale data refers to data that is not the data intended to be read.

For example, assume that a first cacheline "AAAA" is stored in a cache entry. Subsequently, a first portion "12" of a second cacheline "1234" is stored in the same cache entry. Therefore, the cache entry stores the data "12AA". A load instruction may target the second portion of the second cacheline. The set predict mechanism may indicate that the second cacheline is stored in the data cache (232). In response, the load instruction reads the second portion of the cacheline from the cache entry ("12AA"), which results in reading the data "AA" instead of the intended data "34".

Subsequent to the set predict mechanism indicating that the cacheline is stored in the data cache (232), a directory mechanism may determine that the targeted portion of the cacheline is not stored in the data cache (232). The directory mechanism is logic within the LSS (222) that verifies the indication sent by the set predict mechanism. The directory mechanism may store, in a memory directory, an entry for the cacheline and the cache entry at which the cacheline is currently stored. The directory mechanism may further store, in the memory directory, a set of dummy data elements that track whether each portion of the cacheline is stored in the cache entry. The dummy data elements may be a set of bits, one for each portion of the cacheline. For example, the dummy data elements for a 128-byte cacheline divided into four 32-byte portions may be four bits such as "0000". The dummy data elements may be set according to the portions of the cacheline currently stored in the cache entry. For example, if the first portion of the cacheline is stored in a cache entry, then the dummy data elements stored in the memory directory may be "1000", indicating that the first portion of the cacheline is stored in the cache entry and the second, third, and fourth portions of the cacheline are not stored in the cache entry. As an alternative example, if the first portion of the cacheline is stored in a cache entry, then the dummy data elements stored in the memory directory may be "0111", indicating that the first portion of the cacheline is stored in the cache entry and the second, third, and fourth portions of the cacheline are not stored in the cache entry.

Determining that that memory directory includes an entry for the cacheline may be referred to as a directory conventional hit. Determining, based on the dummy data elements, that the cache entry storing the cacheline includes the requested portion of the data may be referred to as a dummy data hit. Alternatively, determining, based on the dummy data elements, that the cache entry storing the cacheline does not include the requested portion of the data may be referred to as a dummy data miss.

For example, if only a first portion of a cacheline is stored in a data cache (232), a request for the first portion of the cacheline will receive a directory conventional hit and a dummy data hit, and the load instruction will successfully read the intended data from the data cache (232). However, a request for a second portion of the cacheline will receive a directory conventional hit and a dummy data miss.

A load instruction may begin being processed based upon a set predict hit but before the directory mechanism verifies the set predict response. Accordingly, once the LSS (222) determines that a directory conventional hit and a dummy data miss has occurred the load instruction may have already begun the process of reading stale data from the data cache (232). Based on having received the directory conventional hit and a dummy data miss, the LSS (232) stores an indication in an LMQ (308) entry for the load instruction that the requested portion of the cacheline is not stored in the data cache (232) (despite the response received from the set predict mechanism).

Storing (508), in a load reorder queue (304), an indication that the second portion of the cacheline is not stored in the data cache (232) may be carried out by accessing an entry in the LRQ (304) for the load instruction and setting a flag in a dummy data wanted element. The dummy data wanted element is an element that stores a flag that indicates to the LMQ (308) that, despite a hit being received from the set predict mechanism, the requested data is not stored in the data cache. Once the indication is stored in the LRQ (304), the load instruction is relaunched (i.e., launched again).

The method of FIG. 5 also differs from the method of FIG. 4, however, in that determining (406) that the load instruction targets a portion of the cacheline not stored in the cache entry includes receiving (510) an indication that data cache (232) includes the cacheline; and dismissing (512) the indication that data cache (232) includes the cacheline in response to an indication, in a load reorder queue (304), that the second portion of the cacheline is not stored in the data cache (232).

Receiving (510) an indication that data cache (232) includes the cacheline may be carried out by relaunching the load instruction and requesting the portion of the cacheline from the data cache (232). In response, the LSS (222) may receive a set predict hit from the set predict mechanism.

Dismissing (512) the indication that data cache (232) includes the cacheline in response to an indication, in a load reorder queue (304), that the second portion of the cacheline is not stored in the data cache (232) may be carried out by determining that a flag is set for the dummy data wanted element stored in the LRQ (304) entry for the load instruction. The flag instructs the LMQ (308) to dismiss the set predict hit and instead request the portion of the cacheline from the memory controller.

Figure 6:
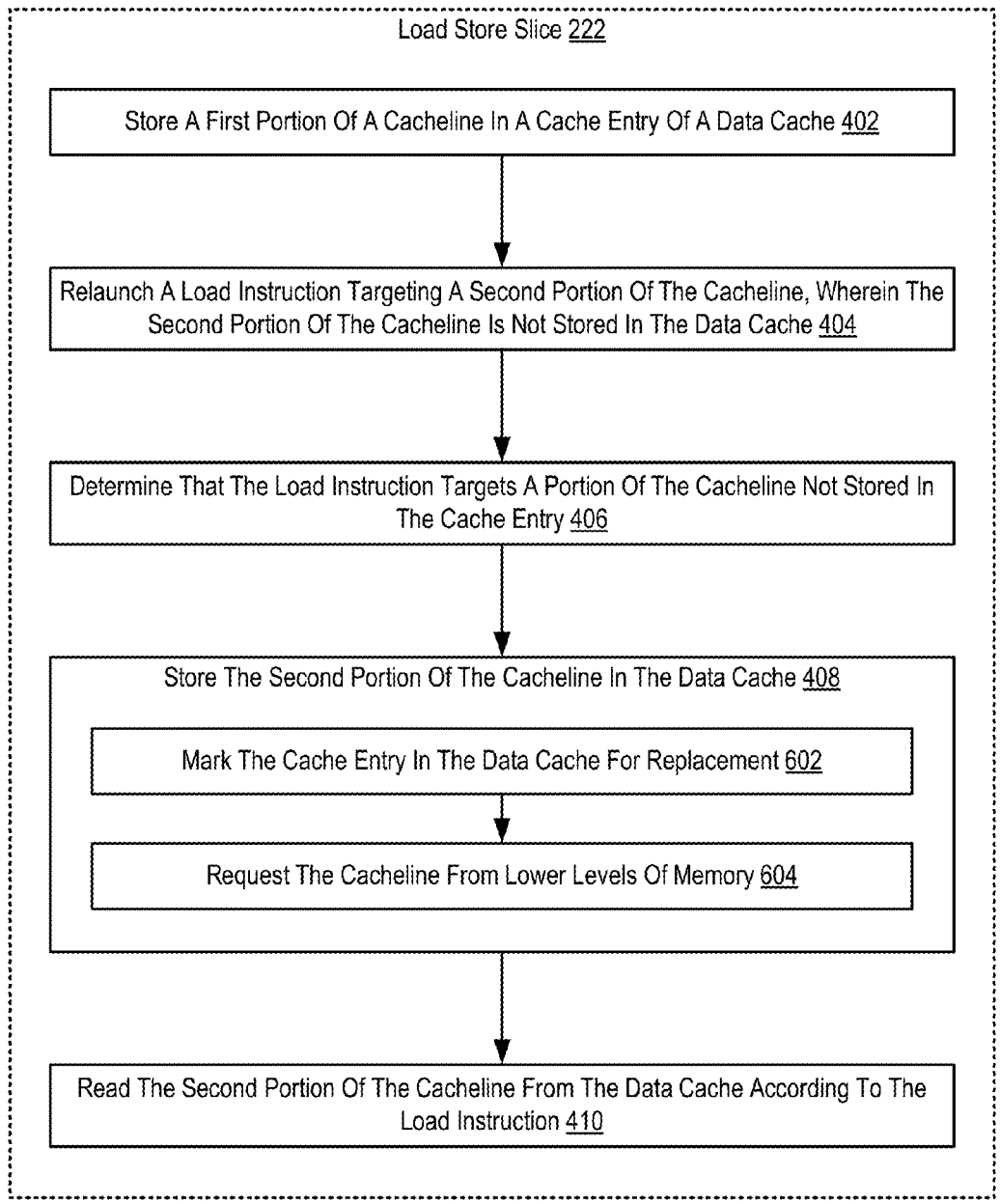
FIG. 6 sets forth a flow chart illustrating an exemplary method for accessing partial cachelines in a data cache according to embodiments of the present invention.

For further explanation, FIG. 6 sets forth a flow chart illustrating an exemplary method for accessing partial cachelines in a data cache according to embodiments of the present invention that includes storing (402) a first portion of a cacheline in a cache entry of a data cache (232); relaunching (404) a load instruction targeting a second portion of the cacheline, wherein the second portion of the cacheline is not stored in the data cache (232); determining (406) that the load instruction targets a portion of the cacheline not stored in the cache entry; storing (408) the second portion of the cacheline in the data cache (232); and reading (410) the second portion of the cacheline from the data cache (232) according to the load instruction.

The method of FIG. 6 differs from the method of FIG. 4, however, in that storing (408) the second portion of the cacheline in the data cache (232) includes marking (602) the cache entry in the data cache (232) for replacement; and requesting (604) the cacheline from lower levels of memory. Marking (602) the cache entry in the data cache (232) for replacement may be carried out by accessing an element within the cache entry used to determine whether to replace the cacheline stored in the cache entry with a more frequently requested cacheline. The element may be a least recently used element, and marking the cache entry for replacement may include setting a flag within the least recently used element for the cache entry.

Marking (602) the cache entry in the data cache (232) for replacement may be performed in response to receiving a directory conventional hit and a dummy data miss. A directory conventional hit may result in the cache entry being marked as most recently used. However, because a dummy data hit was received (i.e., indicating that the requested data is not stored in the data cache (232)), the cacheline must be reloaded into the data cache (232), including the requested portion. Because the data cache (232) may not include two cache entries with the same cacheline, the cache entry currently storing the partial cacheline must be replaced before (or by) the cacheline that includes the requested portion is stored in the data cache (232).

Requesting (604) the cacheline from lower levels of memory may be carried out by the LMQ (308) requesting, from the memory controller, that the entire cacheline be stored in the data cache (232). Requesting (604) the cacheline from lower levels of memory may include appending the second portion of the cacheline stored in level 3 or level 4 memory to a copy of the first portion of the cacheline store stored in level 2 memory. Once appended, the entire cacheline is then stored in the level 1 cache (i.e., data cache (232)).

Figure 7:
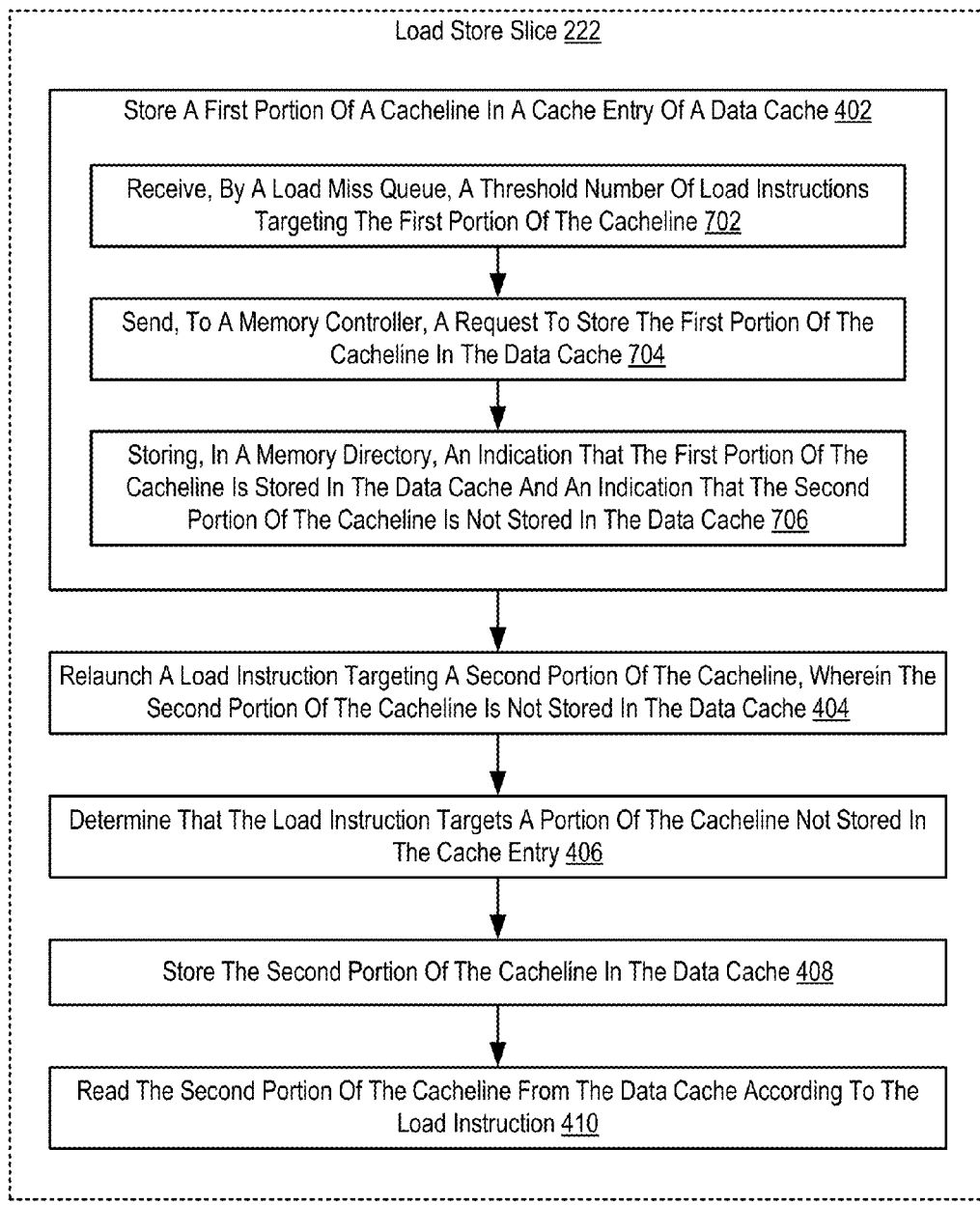
FIG. 7 sets forth a flow chart illustrating an exemplary method for accessing partial cachelines in a data cache according to embodiments of the present invention.

For further explanation, FIG. 7 sets forth a flow chart illustrating an exemplary method for accessing partial cachelines in a data cache according to embodiments of the present invention that includes storing (402) a first portion of a cacheline in a cache entry of a data cache (232); relaunching (404) a load instruction targeting a second portion of the cacheline, wherein the second portion of the cacheline is not stored in the data cache (232); determining (406) that the load instruction targets a portion of the cacheline not stored in the cache entry; storing (408) the second portion of the cacheline in the data cache (232); and reading (410) the second portion of the cacheline from the data cache (232) according to the load instruction.

The method of FIG. 7 differs from the method of FIG. 4, however, in that storing (402) a first portion of a cacheline in a cache entry of a data cache (232) includes receiving (702), by a load miss queue (308), a threshold number of load instructions targeting the first portion of the cacheline; sending (704), to a memory controller, a request to store the first portion of the cacheline in the data cache (232); and storing (706), in a memory directory, an indication that the first portion of the cacheline is stored in the data cache (232) and an indication that the second portion of the cacheline is not stored in the data cache (232).

The procedure described with regards to FIG. 7 may be used to improve the efficiency of loading one portion of a cacheline into the data cache (232) without loading all portions of the cacheline. Separately loading two portions of the same cacheline into an entry in the data cache (232) may be less efficient than loading the entire cacheline once. Therefore, the LMQ (308) may only allow a portion of the cacheline (instead of the entire cacheline) to be stored in the data cache (232) after a threshold number of consecutive load instructions have been received that target data from only one portion of the cacheline.

Receiving (702), by a load miss queue (308), a threshold number of load instructions targeting the first portion of the cacheline may be carried out by receiving a threshold number of load instructions targeting the first portion of the cacheline before receiving a load instruction that targets another portion of the cacheline. This may be carried out using a hysteresis that attempts to prevent separate requests for different portions of the cacheline. For example, a first load instruction targeting portion A of a cacheline may initiate, by the LMQ (308), a fetch procedure for the entire cacheline. If, while waiting for the memory controller to fulfill the initial request for the cacheline, the LMQ (308) receives a threshold number of load instructions targeting portion A of the cacheline before receiving a load instruction targeting any other portion of the cacheline, then the LMQ (308) informs the memory controller that providing only portion A of the cacheline to the data cache (232) is acceptable. If a load instruction targeting another portion, portion B, of the cacheline is received before or after the threshold is met (before the end of the fetch procedure), then the count is reset, and the memory controller may be informed that only the full cacheline should be stored in the data cache (232).

Sending (704), to a memory controller, a request to store the first portion of the cacheline in the data cache (232) may be carried out by informing the memory controller that providing only the requested portion (and excluding the remaining portions) of the cacheline to the data cache (232) is acceptable. The memory controller, under normal circumstances, may provide the entire cacheline to the data cache (232), regardless of whether the LMQ (308) has indicated that providing only a portion of the cacheline is acceptable. However, during periods of high congestion in the lower levels of memory, the memory controller may prefer to provide only a portion of the cacheline to the data cache (232) upon receiving an indication that doing so is acceptable.

Storing (706), in a memory directory, an indication that the first portion of the cacheline is stored in the data cache (232) and an indication that the second portion of the cacheline is not stored in the data cache (232) may be carried out by altering the dummy data elements in the memory directory to correspond with the portion of the cacheline stored in the data cache (232). For example, if the second 64-byte portion of a 128-byte cacheline has been stored in the data cache (232) (without storing the first 64-byte portion), the data dummy elements may be set as "01", with "0" indicating that the first 64-byte portion has not been stored in the data cache (232), and the "1" indicating that the second 64-byte portion has been stored in the data cache (232).

Exemplary embodiments of the present invention are described largely in the context of a fully functional computer system for accessing partial cachelines in a data cache. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for accessing partial cachelines in a data cache, the method comprising:
   storing a first portion of a cacheline in a cache entry of the data cache;
   relaunching a load instruction targeting a second portion of the cacheline, wherein the second portion of the cacheline is not stored in the data cache and relaunching the load instruction further comprises: launching the load instruction targeting a second portion of the cacheline; receiving an indication that data cache includes the cacheline; reading stale data from the cacheline; and in response to reading stale data from the cacheline, storing, in a load reorder queue, an indication that the second portion of the cacheline is not stored in the data cache;

determining that the load instruction targets a portion of the cacheline not stored in the cache entry;
storing the second portion of the cacheline in the data cache; and
reading the second portion of the cacheline from the data cache according to the load instruction.

2. The method of claim 1, wherein determining that the load instruction targets the portion of the cacheline not stored in the cache entry comprises:
receiving an indication that data cache includes the cacheline; and
dismissing the indication that data cache includes the cacheline in response to an indication, in a load reorder queue, that the second portion of the cacheline is not stored in the data cache.

3. The method of claim 1, wherein storing the second portion of the cacheline in the data cache comprises:
marking the cache entry in the data cache for replacement; and
requesting the cacheline from lower levels of memory.

4. The method of claim 1, wherein storing the first portion of the cacheline in the cache entry of the data cache comprises:
receiving, by a load miss queue, a threshold number of load instructions targeting the first portion of the cacheline; and
sending, to a memory controller, a request to store the first portion of the cacheline in the data cache.

5. The method of claim 4, further comprising:
storing, in a memory directory, an indication that the first portion of the cacheline is stored in the data cache and an indication that the second portion of the cacheline is not stored in the data cache.

6. The method of claim 1, wherein storing the second portion of the cacheline in the data cache comprises storing all portions of the cacheline in the data cache.

7. A processor configured to carry out:
storing a first portion of a cacheline in a cache entry of the data cache;
relaunching a load instruction targeting a second portion of the cacheline, wherein the second portion of the cacheline is not stored in the data cache and relaunching the load instruction further comprises: launching the load instruction targeting a second portion of the cacheline; receiving an indication that data cache includes the cacheline; reading stale data from the cacheline; and in response to reading stale data from the cacheline, storing, in a load reorder queue, an indication that the second portion of the cacheline is not stored in the data cache;
determining that the load instruction targets a portion of the cacheline not stored in the cache entry;
storing the second portion of the cacheline in the data cache; and
reading the second portion of the cacheline from the data cache according to the load instruction.

8. The processor of claim 7, wherein determining that the load instruction targets the portion of the cacheline not stored in the cache entry comprises:
receiving an indication that data cache includes the cacheline; and
dismissing the indication that data cache includes the cacheline in response to an indication, in a load reorder queue, that the second portion of the cacheline is not stored in the data cache.

9. The processor of claim 7, wherein storing the second portion of the cacheline in the data cache comprises:
marking the cache entry in the data cache for replacement; and
requesting the cacheline from lower levels of memory.

10. The processor of claim 7, wherein storing the first portion of the cacheline in the cache entry of the data cache comprises:
receiving, by a load miss queue, a threshold number of load instructions targeting the first portion of the cacheline; and
sending, to a memory controller, a request to store the first portion of the cacheline in the data cache.

11. The processor of claim 10, further comprising:
storing, in a memory directory, an indication that the first portion of the cacheline is stored in the data cache and an indication that the second portion of the cacheline is not stored in the data cache.

12. The processor of claim 7, wherein storing the second portion of the cacheline in the data cache comprises storing all portions of the cacheline in the data cache.

13. An apparatus comprising a processor configured to carry out:
storing a first portion of a cacheline in a cache entry of the data cache;
relaunching a load instruction targeting a second portion of the cacheline, wherein the second portion of the cacheline is not stored in the data cache and relaunching the load instruction further comprises: launching the load instruction targeting a second portion of the cacheline; receiving an indication that data cache includes the cacheline; reading stale data from the cacheline; and in response to reading stale data from the cacheline, storing, in a load reorder queue, an indication that the second portion of the cacheline is not stored in the data cache;
determining that the load instruction targets a portion of the cacheline not stored in the cache entry;
storing the second portion of the cacheline in the data cache; and
reading the second portion of the cacheline from the data cache according to the load instruction.

14. The apparatus of claim 13, wherein determining that the load instruction targets the portion of the cacheline not stored in the cache entry comprises:
receiving an indication that data cache includes the cacheline; and
dismissing the indication that data cache includes the cacheline in response to an indication, in a load reorder queue, that the second portion of the cacheline is not stored in the data cache.

15. The apparatus of claim 13, wherein storing the second portion of the cacheline in the data cache comprises:
marking the cache entry in the data cache for replacement; and
requesting the cacheline from lower levels of memory.

16. The apparatus of claim 13, wherein storing the first portion of the cacheline in the cache entry of the data cache comprises:
receiving, by a load miss queue, a threshold number of load instructions targeting the first portion of the cacheline; and
sending, to a memory controller, a request to store the first portion of the cacheline in the data cache.

17. The apparatus of claim 16, further comprising:
storing, in a memory directory, an indication that the first portion of the cacheline is stored in the data cache and an indication that the second portion of the cacheline is not stored in the data cache.

* * * * *